Sept. 3, 1968 C. A. G. LE MAY 3,400,368

PATTERN SENSING DEVICES

Filed Nov. 26, 1963 5 Sheets-Sheet 2

Sept. 3, 1968 C. A. G. LE MAY 3,400,368

PATTERN SENSING DEVICES

Filed Nov. 26, 1963 5 Sheets-Sheet 5

United States Patent Office 3,400,368
Patented Sept. 3, 1968

3,400,368

PATTERN SENSING DEVICES

Christopher Archibald Gordon Le May, Isleworth, Middlesex, England, assignor to Electric & Musical Industries Limited, Hayes, Middlesex, England, a British company Filed Nov. 26, 1963, Ser. No. 326,136
Claims priority, application Great Britain, Nov. 28, 1962, 44,914/62
14 Claims. (Cl. 340—146.3)

ABSTRACT OF THE DISCLOSURE

An arrangement for logically combining analogue signals in which, two or more analogue signals are represented as charges on respective integrators of which the outputs are quantized and combined in the desired logical manner, and, if the combined output exceeds a threshold, the charge on a third integrttor is increased and at the same time the charges on the first two integrators are reduced until the combined output no longer exceeds the threshold, when the charge on the third integrator represents the extent to which the logical combination is present. The arrangement is described as a precoder for a pattern recognition device in which the analogue signals represent the amounts of respective simple features present in a pattern and the outputs of the arrangement represent the presence of more complex features. The arrangement can also be used as a shifting register for analogue signals.

Figures 1A, 1B, 5:
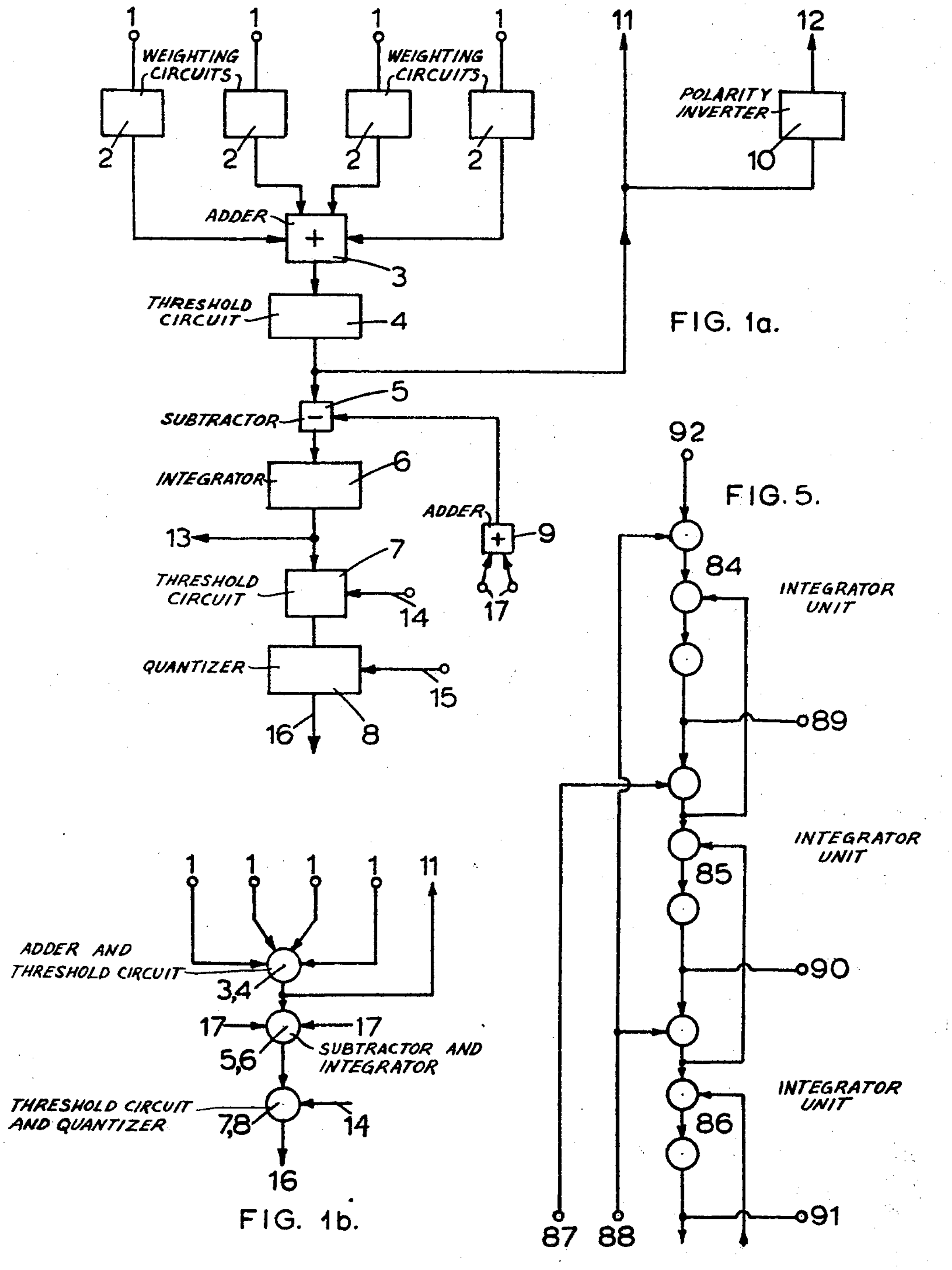

The present invention relates to signal translating circuits suitable for use in pattern sensing devices, that is to say, devices to which signals representing a pattern may be applied and from which other signals are produced, for example, indicating the presence or absence of certain elements in the pattern. The input signal may, in one example, be a television video waveform from a television camera focussed on the pattern.

A video waveform derived from scanning a pattern presents the elements of the pattern in serial form whereas pattern recognition devices usually require that the pattern be presented in parallel so that combinations of elements may be detected. Digital storage devices have been proposed for converting serially presented information into parallel form, but the use of these presupposes that the analogue input data is converted to digital form for storage, and this analogue to digital conversion is usually of an elementary variety to economize on storage capacity, which means that most of the input information is thrown away in the conversion to digital form and the decision reached by the pattern recognition device likely to error if the pattern is at all mutilated.

An alternative method of obtaining a parallel input for the pattern recognition device is to use a matrix of photoelectric cells or other sensors, with separate threshold devices and amplifiers. However, for complex patterns as many as one million sensors and amplifiers might be required, which would lead to extreme expense and unreliability.

It is an object of the present invention to provide an improved signal translating circuit for a pattern sensing device which enable the production from a serial form of analogue input signal derived from a pattern of a parallel output signal of a form suitable for a pattern recognition device in which the analouge information is at least partially retained.

According to the present invention a signal translating circuit comprising at least two integrators, an input circuit responsive to at least one input signal for applying a signal to be integrated to a first of said integrators, a quantizing circuit responsive to the output of said first integrator to produce an output signal of predetermined magnitude when the output of said first integrator exceeds a predetermined level, a threshold device, means for applying the output signal of said quantizing circuit to said threshold device, means for applying at least one other signal to said threshold device, means for connecting the output of said threshold device to a second of said integrators to apply thereto a signal to be integrated when the output of said quantizing circuit and said other signal together exceed the threshold of said threshold device and feedback means responsive to the output of said threshold device to apply a signal to said first integrator in the sense to tend to remove the output signal of said threshold device, whereby the total of said input signal integrated in said first integrator tends to be transferred to said second integrator under the control of said other signal.

Figure 2:
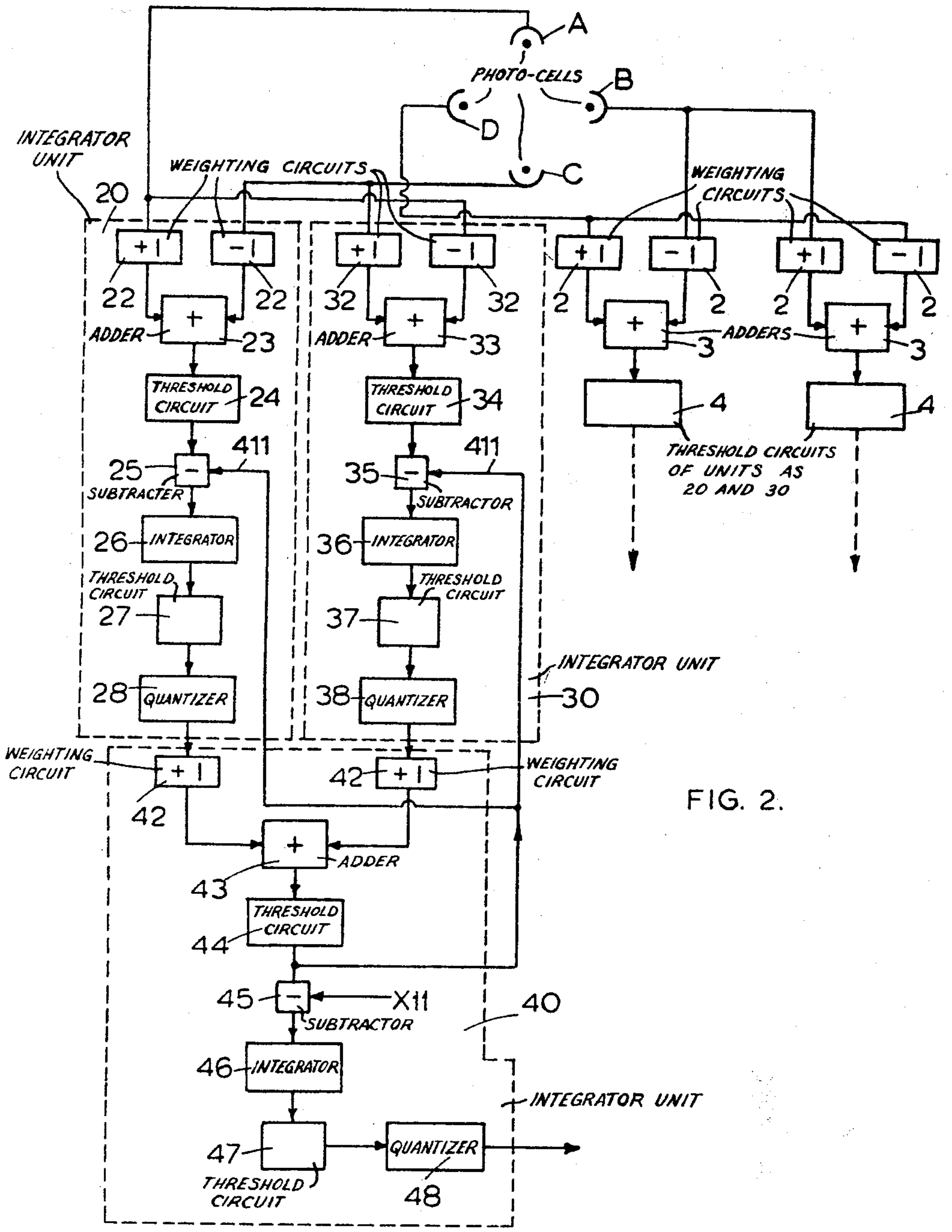
Figure 3:
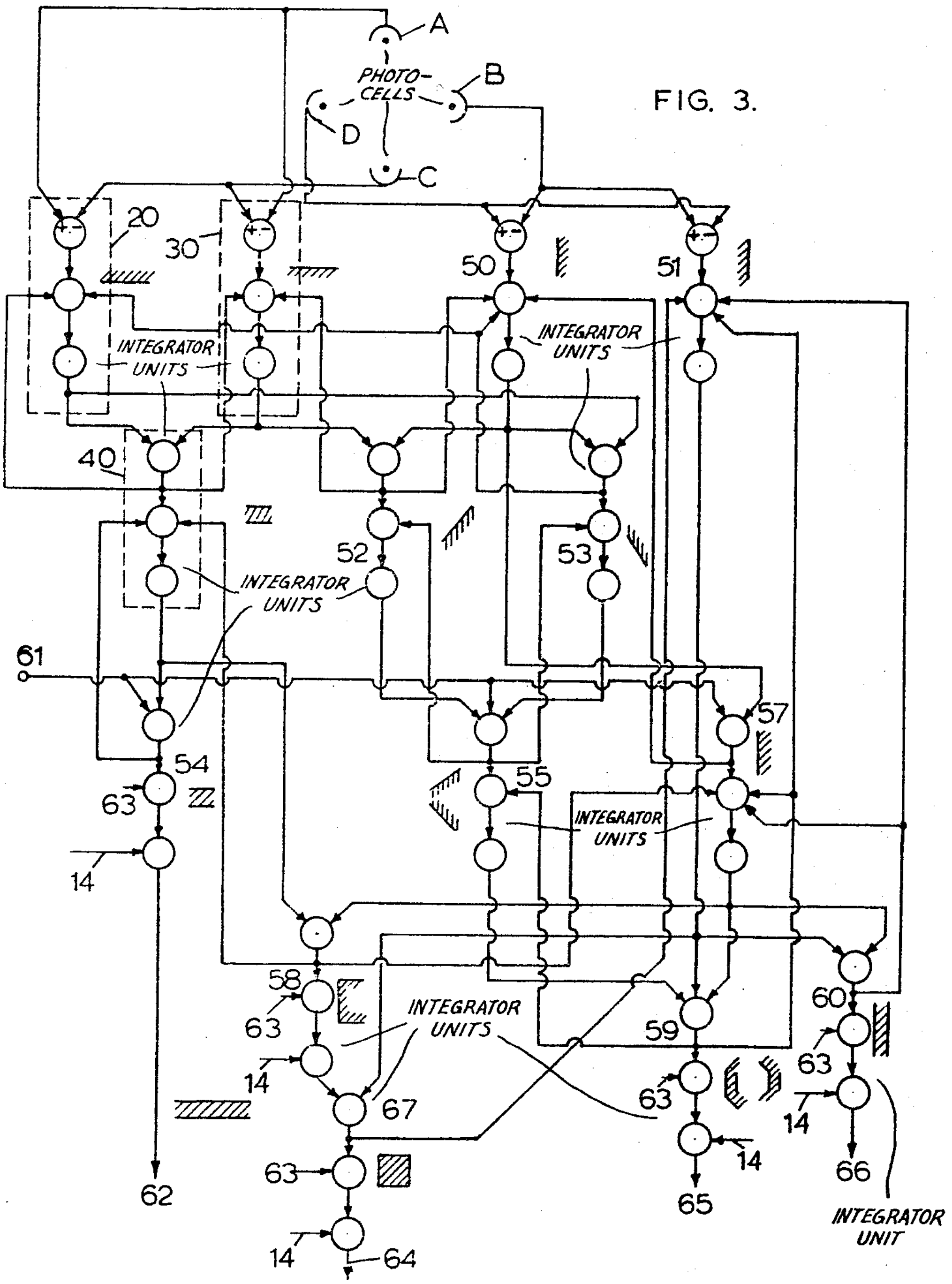
Figure 4:
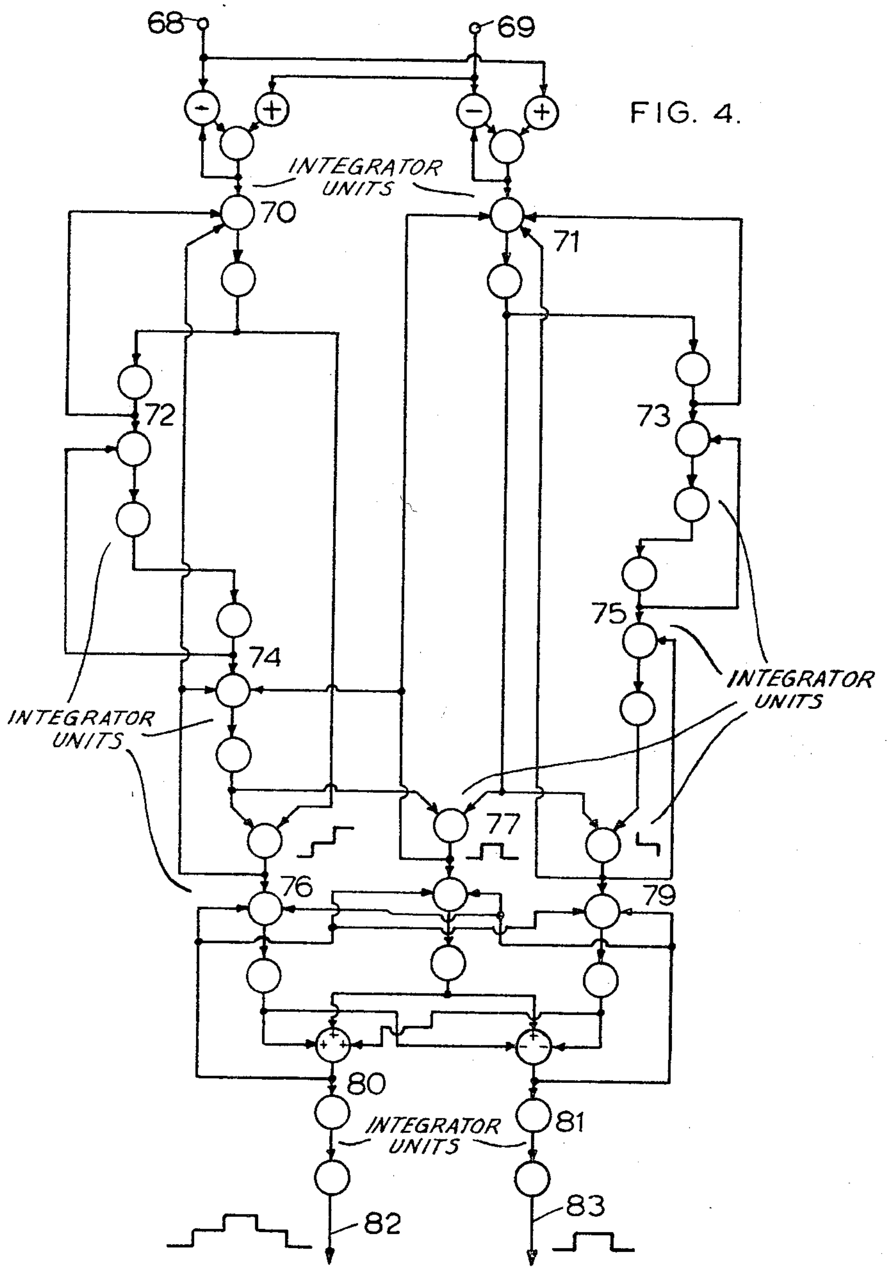
Figure 6:
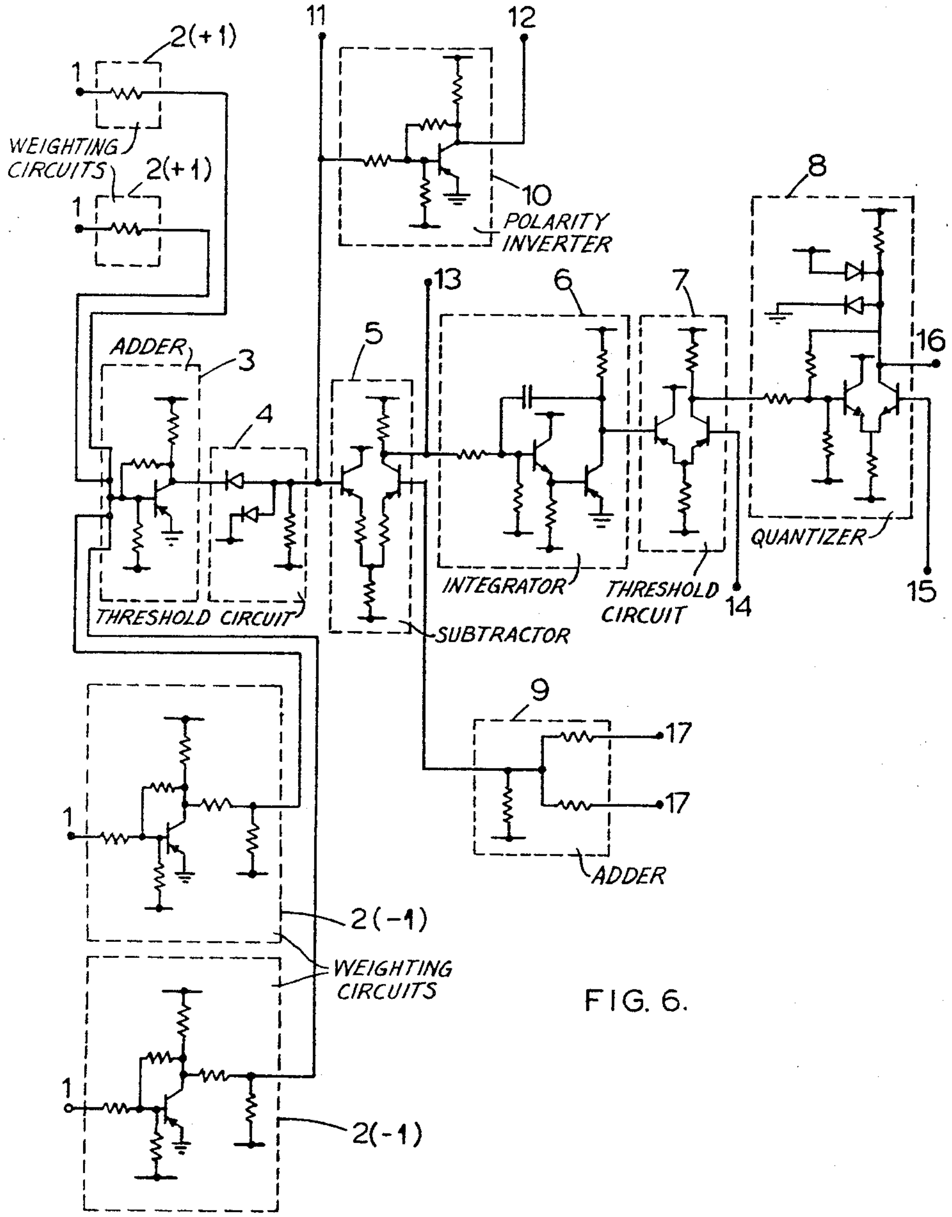

In order that the invention may be fully understood and readily carried into effect it will now be described with reference to the accompanying drawings of which:

FIGURE 1(*a*) is a block diagram of basic integrating units in accordance with one embodiment of the present invention, FIGURE 1(*b*) shows a simplified diagrammatic representation of the units of FIGURE 1(*a*), this representation is used for ease of illustration in FIGURES 3, 4 and 5, FIGURE 2 shows the interconnection of three units of the type shown in FIGURE 1 to produce output information corresponding to a particular feature of a pattern, FIGURE 3 shows an arrangement of the units of FIGURE 1 for producing outputs corresponding to a number of pattern features, FIGURE 4 illustrates a circuit capable of discriminating between two and three levels of voltage at its input, FIGURE 5 shows a method of interconnecting the basic units to provide a shifting register for analogue signals, and FIGURE 6 is a circuit diagram showing in greater detail one example of a basic integrating unit.

Referring to FIGURE 1(*a*) the basic unit comprises a plurality of input terminals 1 each connected via a respective weighting circuit 2 to inputs of an adder 3. The output of the adder 3 is applied to a threshold device 4 from which signals are applied via the subtractor 5 to the integrator 6. The signals from the device 4 are also applied directly to the output 11 and after inversion by 10 to the output 12. The output of the integrator 6 is connected to the threshold device 7 an output signal from which is applied to the quantizer 8 which produces an output of predetermined magnitude on the conductor 16. The threshold of the device 7 is determined by the voltage on the conductor 14 and the threshold of the quantizer 8 is determined by the voltage applied along the conductor 15. The output of the integrator 6 is also applied directly to the conductor 13. A second input to the subtractor 5 is supplied by the adder 9 in response to the inputs on the terminals 17.

In operation of the arrangement of FIGURE 1(*a*) input signals which may be of analogue or quantized form, are applied to the terminals 1 and after weighting in the units 2, for example, multiplication by $\pm 1$, the signals are combined in the adder 3. For some applications weighting factors other than $\pm 1$ may be desirable. If the output of the adder 3 exceeds the threshold of the device 4 the overflow from the device 4 modified by subtractor 5 is integrated by 6. As the output of the integrator 6 rises it will eventually exceed the threshold of the device 7 by a sufficient amount to cause the quantizer 8 to produce an output signal. Signals from other units (not shown) similar to that shown in FIGURE 1(*a*), for example, are applied to the terminals 17 to reduce the value stored by the integrators 6 in a manner to be explained later with reference to FIGURE 2. It will be seen from the figure that an output corresponding to the overflow of the threshold 4 is available from conductors 11 and 12 with opposite polarities. The appropriate one of these outputs depending on the input weighting may be used to reduce the charge on an integrator of a previous unit by means of a component of that unit corresponding to the subtractor 5. The purpose of the invertor 10 is to provide a signal reversed in polarity in the event that the previous unit from which the integrator is being reset is connected to the integrator shown by means of a weighting circuit having a weight of −1.

FIGURE 1(*b*) is a simplified form of the arrangement for FIGURE 1(*a*) in which the elements 3 and 4, 5 and 6, and 7 and 8 are combined as shown in the figure. All references of FIGURE 1(*b*) correspond to those of FIGURE 1(*a*). This notation is a form of shorthand for the units and is used to reduce the complexity of FIGURES 3, 4 and 5. It should be noted that the number of input paths to the basic integrating units may be much larger than four.

The arrangement of FIGURE 2 shows three units of the type just described interconnected for the purpose of sensing a particular feature of a pattern. In order to sense a pattern four photoelectric cells A, B, C and D are provided at the vertices of a diamond of much smaller size than the pattern, the diamond-shaped array of photo-cells being effectively moved in successive lines of a raster across the pattern to produce four output signals. The output signals from the cells A and C are applied to the inputs of the basic units 20 and 30. In the unit 20 the output of the cell A has a weighting of +1 and the output of the cell C the weighting of −1, whilst in unit 30 the output of the cell C has a weighting of +1 and the output of the cell A a weighting of −1. The output signals of the units 20 and 30 are applied to the inputs of a further unit 40 both with a weighting of +1. Since the units 20, 30 and 40 are similar to the units shown in FIGURE 1(*a*) they will not be described in detail.

If a horizontal edge of the pattern falls across the diamond of photo-cells A, B, C and D with the lighter side of the edge uppermost the output of the cell A will exceed that of the cell C with the result that the output of the adder 23 will exceed the threshold of the device 24 and therefore the value stored in the integrator 26 will tend to rise to a value depending on difference between the outputs of cells A and C and the time for which these outputs are applied to the unit 20. It is assumed that the value in the integrator 26 will rise to a value sufficient to cause the quantizer 28 to produce an output signal after a short period of time which is applied to one input of the unit 40.

The unit 30 having its inputs reversed in polarity with respect to those of the unit 20 will not produce an output from its adder 33 sufficient to exceed the threshold of the device 34. However had the edge been such that the output from the photo cell C was greater than that of the photo-cell A then the unit 30 would have produced an output signal after a short period of time whilst the unit 20 would not have produced an output signal.

Suppost therefore that the array of photo-cells is scanned vertically over a pattern and that this pattern contains a horizontal bar, then as the photo cell A reaches this bar the integrator 36 of the unit 30 will start to accumulate a charge and will continue to do so until the photo-cell C reaches the bar at which time it is assumed that the charge on the integrator 36 is sufficient to cause the quantizer 38 to produce an output signal. When the photo-cell A leaves the bar the output of the cell A will exceed that of the cell C and therefore the integrator 26 of the unit 20 will accumulate a charge sufficient to cause the quantizer 28 to produce an output signal. The combination of the outputs of the units 20 and 30 is sufficient when added in the adder 43 to exceed the threshold of the device 44 so that a signal is applied to the integrator 46. The signal from the device 44 is also transmitted by conductors 411 to the subtractors 25 and 35 so as to reduce the charges on the integrators 26 and 36. The output from the device 44 will persist until one or both of the integrators 26 and 36 has its charge reduced to below the threshold level of the respective threshold device 27 or 37. Since the output of the device 44 not only reduces the charges on the integrators 26 and 36, but also increases the charge on the integrator 46, it follows that the charge on the integrator 46 is increased by the amount by which the lower of the charges on the integrators exceeded their respective threshold values. Also since at least one of the integrators 26 and 36 is reset to its threshold level, the charge on the integrator 46 is increased to the extent of the input signal to the one or other of the units 20 and 30. Thus if the array of photo-cells A, B, C and D traverses a succession of horizontal bars or traverse the same bar in successive scans the integrator 46 will have its charge raised sufficiently to cause an output to be produced from the corresponding quantizer 48. It is clear that the charge stored in the integrator 46 represents the number of horizontal bars detected by the photo-cells A, B, C and D on the number of times the same horizontal bar is traversed.

The operation of the arrangement of FIGURE 2 just described is a simple example of the invention by means of which the analogue input signals, in that case the light sensed by the photo-cells A and C, is not destroyed by simple quantizing as in the prior art but is transmitted through the integrating units to form a final analogue value which represents the frequency of occurrence of a particular feature in the pattern. If one or more of these features is mutilated in the particular example of the pattern then the output analogue signal will be only slightly reduced. A pattern feature is a component of a pattern, such as a horizontal bar, a vertical bar, a diagonal bar, an end to a bar, a curve convex to the left or a curve convex to the right, the presence of which in a pattern may assist in identifying the pattern and distinguishing it from other patterns.

When the output of the integrator 46 exceeds the threshold of the device 47 the quantizer 48 an output signal is produced which indicates that a predetermined number of horizontal bars has been traversed by the photo-cells. If this information is applied to another basic unit then feedback from this unit will be applied along the conductor X11 in the same way as feedback from the unit 40 was applied via the conductors 411 to the subtractors 25 and 45. Three other units similar to 20, 30 and 40 may be included in FIGURE 2 to respond to the outputs of the photo-cells B and D thereby to sense the presence of vertical bars in the pattern, but in this case the length of the vertical bar is sensed in two scans only, one for the first edge and one for the second edge and the charges on the integrators, depending as they do on the length of time for which an input is applied, are measures of the lengths of the vertical edges. The term edge is used, to mean a transition from black to white or white to black in the pattern.

FIGURE 3 shows in simplified diagrammatic form one way in which the principle outlined with reference to FIGURE 2 may be applied several times to sense the presence of a plurality of features in a pattern. In FIGURE 3 fourteen separate units are interconnected in the manner shown, each unit being represented by the notation of FIGURE 1(*b*), The units 20, 30 and 40 are interconnected in the manner shown in FIGURE 2 and operate as described with reference to that figure. The units 50 and 51 are connected to respond to the outputs of the photo-cells B and D in the same way as the units 20 and 30 responded to the photo-cells A and C and therefore store charges representing the lengths of the vertical edges scanned. The outputs from the units 30 and 50 are applied to the unit 52 which therefore responds to the presence of both a horizontal and a vertical edge, that is to say a diagonal edge, since if in fact a horizontal edge and a vertical edge had been present in the strip of the pattern scanned, the section of horizontal edge would have been small and therefore the charge transferred to the integrator of the unit 52 in a single line scan is small. At the end of the line scan the integrator of unit 50 has its charge transferred to the integrator of unit 57, and therefore unless there are many line scans in which both horizontal and vertical edges are sensed the charge on the integrator of unit 52 remains small. In this way the unit 52 responds to diagonal edges only. Note that throughout FIGURE 3 the feature of the pattern to which the particular unit responds is indicated beside each unit. The unit 53 responds to the outputs of units 20 and 50 so that it senses diagonal edges sloping the other way to those sensed by the unit 52.

A signal is applied to the terminal 61 which is connected to the units 54, 55 and 57. This signal takes the form of a pulse occurring at the end of each vertical scan of the photo-cells over the pattern so that, for example, the charge in the integrator of the unit 40 is transferred to the unit 54 at the end of each scan. Therefore although the unit 40 may have sensed several horizontal bars in the pattern in previous lines its charge during any particular line scan will be only that due to the horizontal bars sensed in that scan. The unit 54 counts the number of vertical scans in which the unit 40 senses a horizontal bar and produces an output signal on conductor 62 which indicates that there is a horizontal bar of greater than a predetermined length since it is assumed that as the unit 40 had detected the horizontal bar in each vertical scan these are due to a single bar which continues across the pattern. The device 55 is enabled to respond to the outputs of units 52 and 53 at the end of each vertical scan so that if diagonal edges sloping both ways had occurred the value stored in the integrator of the unit 55 would be increased by one unit. It is necessary that both of these diagonal edges occur in the same vertical scans because it is only if both units 52 and 53 have a charge that a signal is passed to the unit 55, and since the unit 55 will only produce an output after a number of signals from units 52 and 53 it follows that the pattern must include both diagonal edges in a number of vertical scans for the unit 55 to produce an output. The unit 57 is connected to respond to the output of the unit 50 at the end of each line scan so that if a vertical edge of the type to which the unit 50 responds did occur in that line then charge on the integrator of the unit 57 will be increased by an amount proportional to the charge on the integrator of the unit 50 and therefore proportional to the length of the vertical edge.

The output of the unit 51 together with that of the unit 57 is applied to a unit 60 so that the charge upon the integrator of the unit 60 therefore corresponds to the occurrence of vertical bars in the pattern. The unit 59 responds not only to the outputs of the units 57 and 51 but also to the unit 55 so that the charge on the integrator of the unit 59 corresponds to the occurrence of the left and right hand sides of a loop, for example, as shown in FIGURE 3. It should be noted that particularly in the case of the unit 59 and also in the cases of other units, other combinations of features could produce a similar effect on the photo-cells so that the charges on the integrators may be increased by configurations in the pattern other than those shown but those shown are the most likely to occur. The unit 58 which responds to the output of the unit 40 and also of the unit 57 responds to the occurrence of a left hand vertical edge followed by upper and lower edges in the next scans so that when an output is obtained from the unit 51 indicating a right hand vertical edge the unit 67 produces an output on the conductor 64 which indicates the presence of a rectangle in the pattern.

It will be evident that the outputs of the units may be combined in many different ways to produce signals representing many other configurations than those examples shown in FIGURE 3. In FIGURE 3 the reference numerals 15 indicate a number of conductors to which a threshold control signal dependent on the size or intensity of illumination of the pattern, for example, is applied for some of the units. Preferably, the signal applied to the conductors 14 is derived by summing the output signals of the units 54, 58, 59, 60 and 67; in this way variations in illumination and size of the pattern are automatically compensated. Conductors 63 are provided to reset the integrators of certain units since these integrators are not subject to a feedback signal from subsequent units and therefore have to be reset by an externally applied signal after the analogue data contained by the integrators have been transmitted, for example, to a pattern recognition device.

The four photo-electric cells A, B, C and D of FIGURES 2 and 3 may readily be replaced by other devices such as, for example, four separate television pick-up tubes each receiving an image of the pattern or by means of a single pick-up tube having a direct output and three differently delayed outputs to produce the effect of the diamond shaped array of sensing points.

In a practical embodiment of the invention based on FIGURE 3, the array of photo-electric cells A, B, C and D could be replaced by a ring of six cells. Of course, many other arrangements of photo-cells or sensing points may be used.

In FIGURE 4 a number of basic units are interconnected so as to enable discrimination between signals having two or three levels of intensity to be achieved. In the figure input terminals 68 and 69 are provided; to the terminal 68 a television type video waveform is applied and to the terminal 69 the same waveform is applied after a small delay. The terminal 68 is connected via a weighting unit of value −1 to the input of the unit 70 and to the input of a unit 71 via a weighting unit of value +1. The terminal 69 is connected via a weighting unit of value −1 to the input of the unit 71 and via a weighting unit of value +1 to the input of the unit 70. The outputs of the first threshold devices of the units 70 and 71 are applied via weighting units of value −1 to their inputs. The output of the unit 70 is connected to the input of the unit 72 from which an output signal is applied to the unit 74. A unit 76 is connected to respond to the outputs of units 70 and 74. The output of the unit 71 is connected to the input of the unit 73 from which the output is applied to a unit 75. A unit 79 is connected to respond to the outputs of units 71 and 75. A unit 77 is connected to respond to the outputs of units 74 and 71. All three of the units 76, 77 and 79 are connected to the inputs of units 80 and 81. All of the inputs are in the positive sense except for the connections from the units 76 and 79 to the unit 81 which are negative. As in FIGURE 2 feedback is provided from all units to all immediately preceding units.

In operation by virtue of the weighting units connected to the inputs of the units 70 and 71 the threshold of the unit 70 follows the difference between the video signals applied to the terminals 69 and 68 and that of the unit 71 follows the difference between the video signals applied to the terminals 68 and 69. Since the waveform applied to the terminal 69 is the same as that applied to the terminal 68 but subject to a delay it is clear that the unit 70 responds to rises in the video waveform and the units 71 responds to falls in the video waveform. The unit 72 integrates signals from unit 70 and when its output threshold is reached applies an output signal to the unit 74 of which the integrating network has a longer time constant than those of the other units in the figure, the arrangement being such that if the unit 70 registers a single rise in the input waveform would have ceased to give another output by the time the unit 74 produces an output in response to its input from the unit 72. If however the unit 70 is subjected to a second rise in the input waveform the outputs of the unit 74 and the unit 70 combine to operate the unit 76 so that the signal stored in the integrator of the unit 76 represents two rising steps in the input waveform. The unit 77 which responds to units 74 and 71 stores signals representing a rise followed by a fall that is to say a rectangular pulse in the input waveform. The arrangement of the units 71, 73, 75 and 79 is similar to that of the units 70, 72, 74 and 76 so that the value stored in the integrator of the unit 79 corresponds to two successive falls in the input waveform. The unit 75 also includes a slow integrator as in the unit 74. The slow integrators of the units 74 and 75 are included to provide a delay for the first rise signal; another way in which this delay could be provided is to arrange the input threshold of the units 74 and 75 to require two signals, the second signals being provided from the outputs of the input threshold devices of the units 72 and 73 but being passed through a delay line. The unit 80 is connected to respond to the simultaneous presence of outputs from the units 76, 77 and 79 and produces an output in response to two consecutive rising steps followed by two successive falling steps in the input waveform. The unit 81 is connected to respond to the output of the unit 77 but is inhibited by the outputs of the units 76 and 79 so that the output of the unit 81 indicates a single change in level in the input waveform.

In FIGURE 5 three units are shown connected together to form a shifting register for an analogue signal. Of course it will be understood that many more units than three may be connected in the manner shown. In FIGURE 5 the serial input is applied to the terminal 92 which in the presence of a shift signal on terminal 88 sets the integrator of the unit 84 to a particular analogue value. A shift signal on the terminal 87 will enable the output of the unit 84 to be applied to the unit 85 so that the value which was stored in the integrator of the unit 84 is transferred to the integrator of the unit 85 the feedback connection from the unit 85 ensuring that its transfer is reasonably accurate. A further shift pulse on the terminal 88 will now enable the transfer of the value stored in the integrator of the unit 85 to the unit 86. In this way it is clear that an analogue value may be transmitted down the chain of units in a manner analogous to that of a digital shifting register. Output terminals 89, 90 and 91 are provided between the units so that a parallel output signal corresponding to the serial signal applied to the terminal 92 may be derived therefrom.

FIGURE 6 shows one example of a basic unit of the type shown in FIGURE 1(*b*) constructed from transistors. In the arrangement shown the weighting units 2 comprise merely series resistors if the weighting function is +1 or inverting amplifiers followed by series resistors if the weighting function is −1. The adder comprises a simple inverting amplifier having resistive feedback from its output to its input so that it is enabled to sum the currents received from the weighting units 2. The threshold device 4 consists of a series diode followed by a suitable bias load resistor, a shunt diode being provided to prevent the level of the output of the device falling to too low a value. The output of the device 4 is connected to one input of a subtractor 5 which consists of a long tailed pair transistor amplifier the output from which is derived from the collector of the transistor other than that to which the input signal is applied. The output of the subtractor 5 is applied to the integrator 6 which in the example shown is a Blumlein integrator, although for some applications a simple C.R. circuit would be adequate. The output of the integrator 6 is applied to a threshold device 7 shown as a long tailed pair transistor amplifier in which the threshold level is determined by the bias on the base of one of the transistors. The output of the device 7 is applied to the quantizer 8 which comprises a further long tailed pair transistor amplifier on which the threshold is determined by the base bias of one of the transistors. Two catching diodes are provided in the output of this amplifier to limit its excursion. The feedback signal from the unit is derived from the output of the threshold device 4 and is applied directly to the terminal 11 or after inversion by the transistor amplifier 10 to the terminal 12. The feedback signals to the unit are received on the terminal 17 where they are added by means of two series resistors forming the adder 9 for application to the base electrode of a transistor of the subtractor 5.

It will be appreciated by those skilled in the art that the arrangements hereinbefore described are only a few examples of devices using the invention. For example, combinations of digital signals may be selectively applied in sequence to arrangements of interconnected units to vary the input threshold levels of the units and thereby enable the arrangement to perform a number of different functions in sequence.

What I claim is:

1. A signal translating circuit comprising at least two integrators, an input circuit responsive to at least one input signal for applying a signal to be integrated to a first of said integrators, a quantizing circuit responsive to the output of said first integrator to produce an output signal of predetermined magnitude when the output of said first integrator exceeds a predetermined level, a threshold device, means for applying the output signal of said quantizing circuit to said threshold device, means for applying at least one other signal to said threshold device, means for connecting the output of said threshold device to a second of said integrators to apply a signal to be integrated when the output of said quantizing circuit and said other signal together exceed the threshold of said threshold device, feedback means responsive to the output of said threshold device to apply a signal to said first integrator in the sense to tend to remove the output signal of said threshold device, whereby the total of said input signal integrated in said first integrator tends to be transferred to said second integrator under the control of said other signal, and means responsive to the total integrated in the second integrator to produce an output signal.

2. A circuit according to claim 1 comprising a third integrator, a further input circuit responsive to at least one input signal for applying a signal to be integrated to said third integrator, a second quantizing circuit responsive to the output of said third integrator to produce an output signal of predetermined magnitude when the output of said third integrator exceeds a predetermined level, means for applying the output of said second quantizing circuit to said threshold device as said other signal and second feedback means responsive to the output of said threshold device to apply a signal to said third integrator, said third integrator providing as its output signal said other signal applied to said threshold device, the sense of the signal from said second feedback means applied to said third integrator being such as to tend to remove the output signal of said threshold device.

3. A circuit according to claim 1 wherein said second integrator includes means for producing an output only when the value stored in said second integrator exceeds a predetermined level.

4. A circuit according to claim 1 comprising a plurality of sensing means, arranged to scan an array of related points over a pattern in a succession of lines and means for deriving said input signals from one or more of said sensing means, wherein said other signal applied to said threshold device is a pulse signal generated at the end of each line of the scan.

5. A circuit according to claim 1 wherein said input circuit is responsive to the difference between a waveform and that waveform after a small delay whereby said first integrator responds to a rise or fall in said waveform.

6. A circuit according to claim 1 wherein said other signal is an advancing pulse whereby the value stored in said first integrator is transferred to said second integrator only on the occurrence of said advancing pulse.

7. A circuit according to claim 2 wherein said input signals indicate the presence or absence of features in a pattern.

8. A circuit according to claim 7 comprising a plurality of sensing means, arranged to scan an array of related points over a pattern in a succession of lines and means for deriving said input signals from one or more of said sensing means.

9. A circuit according to claim 8 wherein said sensing means comprise photo-electric cells.

10. A circuit according to claim 8 wherein said sensing means comprise television pick-up tubes having related scanning waveforms.

11. A circuit according to claim 8 wherein said sensing means comprise a single pick-up tube and delay means connected in the output of said tube to provide said plurality of input signals.

12. A circuit according to claim 8 wherein said array comprises four or more points equi-angularly spaced around a circle which is relatively small in size in relation to said pattern.

13. A circuit according to claim 12 wherein the input signals to said first and third integrators are derived from diametrically opposite points of said array, said first integrator records transitions from greater output to lesser from said sensing means in response to said pattern and said third integrator responds to transitions from lesser output to greater from said sensing means in response to said pattern, whereby the output of said second integrator indicates the presence in said pattern of a bar of greater or lesser output from said sensing means.

14. A pattern sensing device comprising a circuit according to claim 8, and a plurality of other integrators connected to respond to the outputs of said sensing means in different combinations, said integrators thereby recording the presence of different features in said pattern a plurality of further integrators and means for transferring to said further integrators the totals recorded in the integrators of said circuit and said other integrators taken in different combinations thereby to produce indications of the presence of a plurality of more complex features in said pattern.

No references cited.

MAYNARD R. WILBUR, *Primary Examiner.*